April 5, 1938.  A. R. STRYKER ET AL  2,113,063
FLUID TESTING APPARATUS
Filed April 8, 1935   5 Sheets-Sheet 1

INVENTORS.
ALBERT R. STRYKER
RICHARD F. PHIPPS
BY Chester Tietig
ATTORNEY.

April 5, 1938.  A. R. STRYKER ET AL  2,113,063
FLUID TESTING APPARATUS
Filed April 8, 1935   5 Sheets-Sheet 4
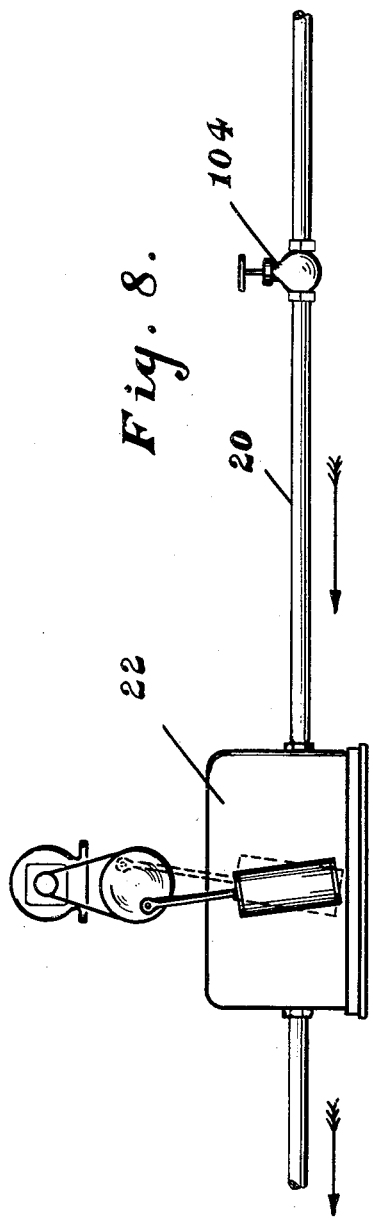
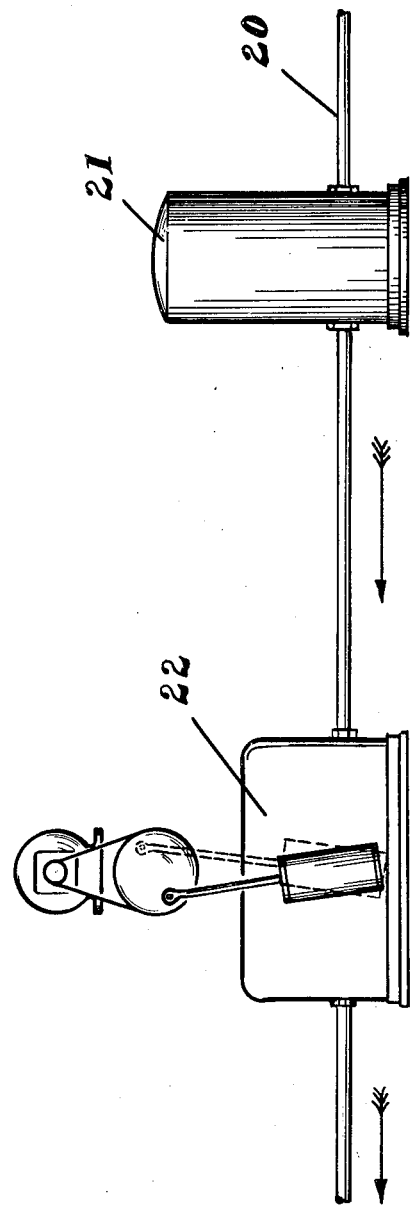
INVENTORS.
ALBERT R. STRYKER
RICHARD F. PHIPPS
BY Chester Tietig
ATTORNEY.

April 5, 1938.　　　A. R. STRYKER ET AL　　　2,113,063
FLUID TESTING APPARATUS
Filed April 8, 1935　　　5 Sheets-Sheet 5

INVENTORS.
ALBERT R. STRYKER
RICHARD F. PHIPPS
BY Chester Tietig
ATTORNEY.

Patented Apr. 5, 1938

2,113,063

UNITED STATES PATENT OFFICE 2,113,063

FLUID TESTING APPARATUS

Albert R. Stryker, Mariemont, and Richard F. Phipps, Cincinnati, Ohio

Application April 8, 1935, Serial No. 15,266

12 Claims. (Cl. 23—255)

This invention relates to an apparatus suitable for testing gases or liquids. The former can be tested for the presence of foreign gases or vapors, while the latter can be tested for pH value or concentration of suspended or dissolved solids.

An object of this invention is to provide such a tester in a form giving a series of spot tests on a continuous tape of paper or other porous material.

Another object is to provide such a tester which can be readily changed from the one form, i. e. a gas tester to a liquid tester and vice versa.

Other objects are to provide controlled speed and volume of the fluid flow, safeguards against tearing of the tape and adaptability to different attachments for reading the test spot.

Briefly stated, our apparatus comprises a test tape, means to apply a test reagent to the tape, means for forcing the fluid to be tested through the spot made by the reagent, means to stop the tape while the test is being performed, means to regulate the flow of fluid to be tested and means to read the spot.

In the drawings,

Fig. 7 is a side elevation of a gas pump and gasometer adapted to bring about a steady flow of the gas to be tested.

Fig. 8 is a side elevation of a liquid pump and a liquid pressure reducing valve which together are adapted to bring about a steady liquid pressure in the liquid testing apparatus.

Figure 1:
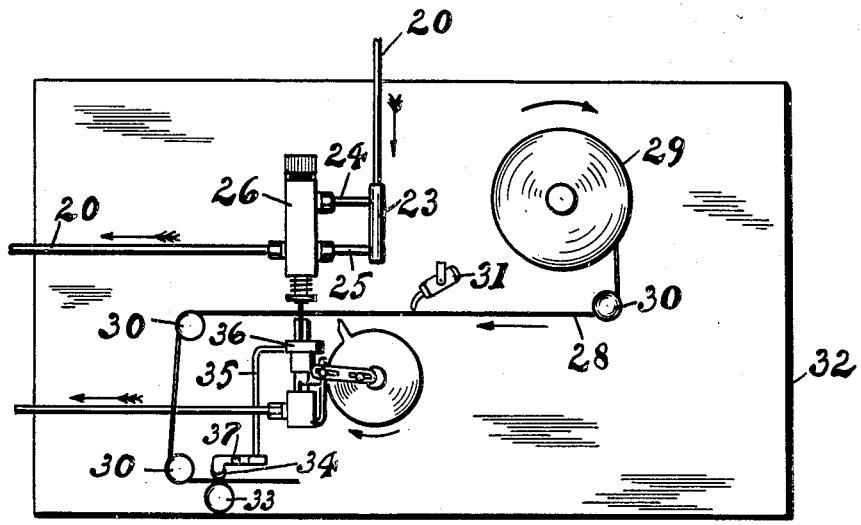
Fig. 1 is a side elevation of the apparatus arranged for gas testing, showing the tape, gas valve and reagent applying means.

Referring now to Figures 1 and 7, pipe 20 is the supply pipe which delivers the gas which is to be tested. In the line is a gasometer 21 with the conventional elevating dome and liquid seal. After the gasometer is a pump 22 which is preferably of the piston type.

Figure 3:
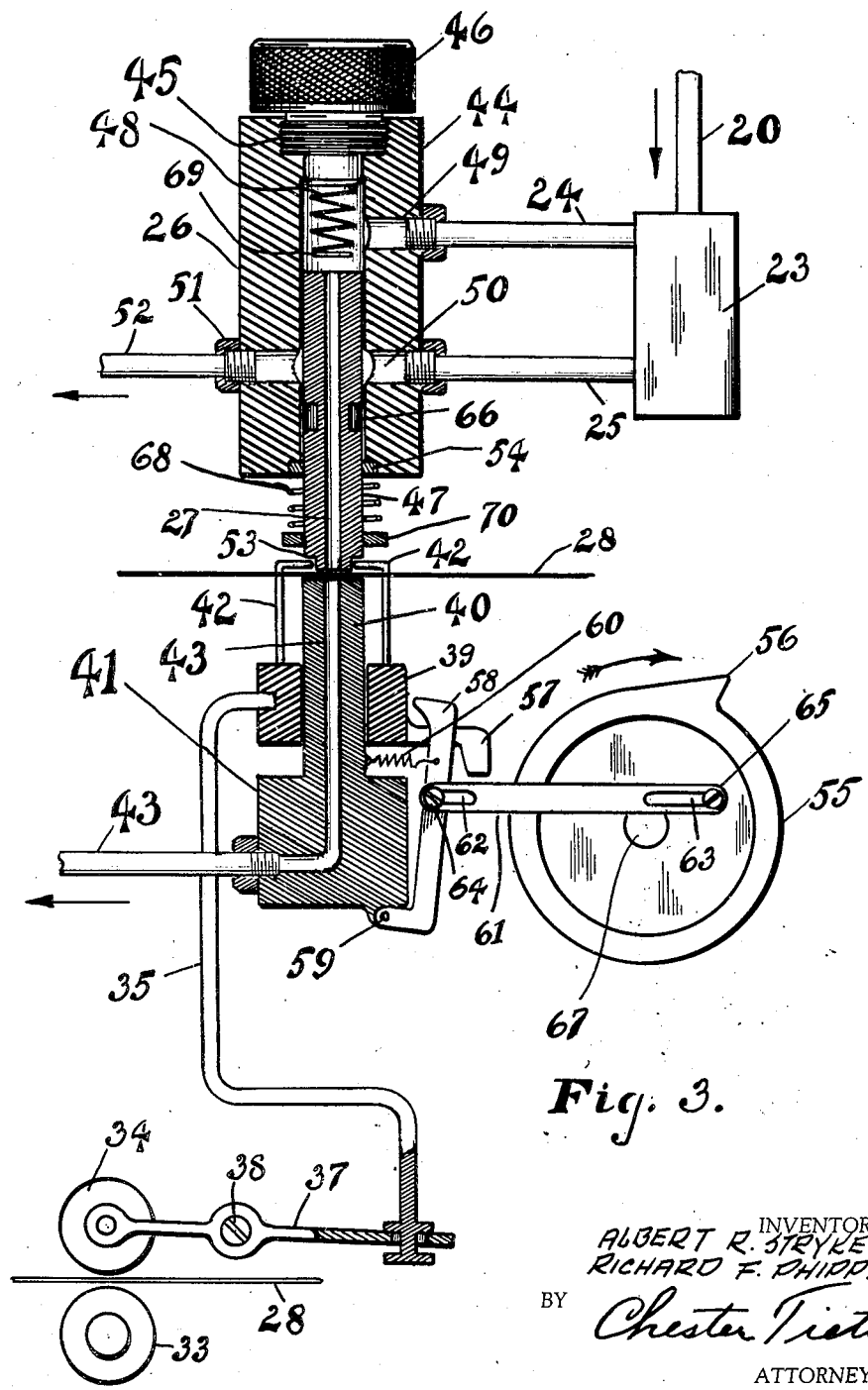
Fig. 3 is an elevational view, partly in longitudinal section of the control valve of the gas testing apparatus and its tape arresting means.

In Fig. 1 pipe 20 delivers gas to a manifold 23 from which an upper pipe 24 and a lower pipe 25 deliver gas to a sampling valve 26 which is shown in detail in Fig. 3. The showing is of the open position, i. e., that in which a stream of gas is directed through an inner duct 27 of the valve and through a bibulous tape 28 (preferably of filter paper). The valve and its action will be described later in detail.

The tape 28 in Fig. 3 is supplied from a reel 29 and passes over a plurality of pulleys 30 so as to bring the tape horizontally under the sampling valve 26 and under a reagent pen 31 which is operable at intervals and actuated from the other side of a panel 32 on which the entire apparatus is mounted. Power for drawing the tape from the reel is supplied by a motor-driven pulley 33 which is also actuated from the other side of the panel. Above the pulley 33 is an idler pulley 34 attached to an arm 35 which is in turn controlled by a tape arresting mechanism 36 which is below sampling valve 26 and tape 28. The purpose of the arm 35 is to enable the idler pulley 34 to be lifted at intervals so as to disengage the tape 28 from frictional contact with power pulley 33, thereby keeping all driving impulse from the tape. In order to make driving contact instantly with the tape when contact is desired, pulleys 33 and 34 are faced with soft rubber. Between the arm 35 and the pulley 34 is a link 37 which is pivoted at 38, this point being its approximate middle.

The upper end of arm 35 is attached to a collar 39 which encircles the exhaust stem 40 of the outlet or tape arresting portion 41 of the sampling valve 26. The portion 41 is all of that part of the valve which is below tape 28. The collar 39 is freely slidable about stem 40 and carries two vertical fingers 42. The tape is held firmly at intervals between stems 40 and 47 during which gas to be tested is forced through the tape and thence through a duct 43 which is an exhaust pipe passing through the valve portion 41 and out to the atmosphere at a point remote from the apparatus. This arrangement is to prevent tested gas from contacting the tape 28 and fogging it.

The upper part of valve 26 comprises a hollow body 44, the top of the cylindrical hollow being threaded as at 45 and closed by a knurled cap screw 46. The body contains a bored delivery stem 47 and surrounding the lower end of the latter a coil spring 68 and a felt gland 54. The body has two inlet ports 49 and 50 accommodating pipes 24 and 25 respectively and on its opposite side, one by-pass port 51 accommodating by-pass pipe 52. The ports are relieved to some extent where they join the cylindrical hollow in the valve body. At approximately the middle point of delivery stem 47 there is a circular channel 66 which is intended to cooperate at intervals with ports 50 and 51 to establish a by-pass when no test is being taken. It is therefore, evident that fluid is always flowing through the apparatus whether a test is being taken or not. Within the upper valve body between nut 46 and stem 47 is a coil spring 48 on the lower end of which is a leather washer 69 which latter is adapted to close the bore 27 of stem 47 when the latter is in raised position. About the lower end of stem 47 is a coil spring 68 which bears on a shoulder 70. This spring supplies the force which tends to keep the stem 47 in a lowered or open position.

The lower end of delivery stem 47 has a shoulder 53 into which the fingers 42 fit. When no test is being taken the fingers are raised into shoulder 53, when gas is being by-passed they hold the stem 47 in a raised position.

Power to accomplish this movement of fingers 42 is supplied by means of a cam 55 which bears a single projection 56. On collar 39 there is a lug 57 with which 56 is adapted to make contact at each revolution of cam 55 to raise collar 39 and fingers 42 until the latter fit into shoulder 53. The lug 57 is in the form of a hook. A follower 58 is pivoted at its lower end to the lower part of body 41 at 59 while its upper end contacts the outer edge of collar 39 so far as other parts of the mechanism will allow. A spring 60 which as shown is in tension, connects follower 58 near its upper end with body 41 below collar 39 and produces the tendency to contact the latter. A link 61 in which there are two lost motion slots 62 and 63 connects the follower 58 through a pin 64 on that member with a longitudinally adjustable pin 65 which is about half way between a shaft 67 which rotates the cam and the outer edge of the latter. Pin 65 is about 20° in advance of projection 56 and the adjustment of the position of pin 65 governs the length of dwell while the sample is being taken.

The cam and collar assembly constitutes a mechanism which serves both to arrest the tape and to operate the sampling valve. Projection 56 raises lug 57, collar 39, arm 35 and lowers pulley 34 thereby setting the tape 28 in motion. Spring 60 pulls follower 58 under collar 39 locking latter in raised position. Simultaneously delivery stem 47 is raised by fingers 42 which collar 39 lifts. The stem is raised until channel 66 registers with ports 50 and 51 to establish a by-pass action which allows gas to leave through pipe 52, duct 27 being closed by spring-pressed leather washer 69. In this position therefore no test is being taken and tape 28 is running freely. After a suitable interval governed by timing mechanism which will be described, cam 55 through linkage 61 pulls follower 58 from under collar 39 and spring 68 causes delivery stem 47, fingers 42 and collar 39 to be depressed, thereby causing the entire mechanism to be shifted back to the sampling position shown in Fig. 3, tape 28 being then stationary and held between stems 40 and 47 by spring 68.

Figure 2:
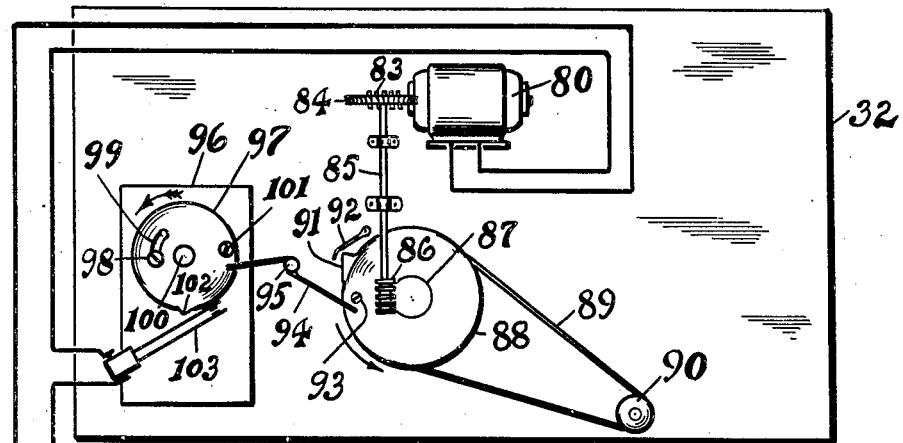
Fig. 2 is also a side elevation showing the opposite side of the mounting panel from that shown in Fig. 1. The electric control means are shown in this view.

Referring now to Fig. 2, the side of the panel 32 reverse of that of Fig. 1 is shown. 80 is here a constant speed electric motor while 81 and 82 are wires supplying driving current for same, preferably 110 volts. There is a worm 83 on the motor shaft meshing with a worm wheel 84. The latter is on a vertical shaft 85 which also bears a worm 86 on its lower end which drives a worm wheel 87 which is keyed to a pulley 88. The worm wheel drives cam 55 on the opposite side of the panel.

About pulley 88 there is a belt 89 which drives a smaller pulley 90, attached by a shaft to pulley 33 on the opposite side of the panel. Pulley 88 has a cam tooth 91 by means of which lever 92 may be tripped. The reagent pen 31 on the opposite side of the panel is attached to the same shaft as lever 92, hence tooth 91 operates to bring the reagent pen into contact with tape 28 at intervals. Also on pulley 88 near its periphery there is a trip 93 which is adapted to engage a double armed trigger 94, pivoted at 95, at each revolution.

Mechanism for arresting the motor 80 at intervals which are exactly spaced is comprised of a clock 96 shown diagrammatically in Fig. 2, a synthetic resin disc 97 driven by the minute-wheel dog 98 of the clock. The disc bears a slot 99 which is adapted to work as a lost motion device. The disc is freely movable about a central pivot 100. Near the periphery of the disc there is a lug 101 which is approximately 180° from the end of slot 99 which is occupied by dog 98 when the latter is driving the disc. The driving position is shown in Fig. 2. The periphery of disc 97 is provided with a single tooth 102 about 110° from lug 101 and 70° from driving end of slot 99. This tooth is adapted to actuate an electrical spring contact 103 to start and stop motor 80.

In order to avoid the long dwell on the contact which would result if the clock only were relied upon to close and open contact 103, the mechanism comprising elements 88, 93, 94, 95 and 101 has been provided. Together these form a kick out device adapted to shorten the dwell. The action is as follows: After contact 103 is closed by tooth 102, pulley 88 makes a revolution, bringing trip 93 into contact with trigger 94 and depressing the latter. This movement causes the opposite end of the trigger to rise and to contact lug 101, forcing the disc 97 around in the direction in which it is going, but at an accelerated rate. The faster rate continues until driving pin 98 of the clock reaches the rear limit of slot 99, at which time tooth 102 is past the electric contact and the circuit is dead so that a sample can be taken.

The general operation of the mechanism of Figures 1, 2 and 3 is therefor as follows: Gas enters pipe 20 and is by-passed through valve 26 to the atmosphere while tape is being unreeled by pulley 33 from reel 29. During this time reagent pen 31 is tilted for an instant, spotting the paper.

At a predetermined later time, governed by the cam 55, the sampling valve closes the by-pass, grips the tape and allows the gas to flow through the spot previously wet with reagent. After bringing the sampling valve to sampling position, and after 88 makes a complete revolution, trip 93 acting on trigger 94 contacts lug 101, rotating the disc 97 until the rear end of slot 99 is encountered by pin 98 causing tooth 102 to pass spring contact 103, releasing contact and breaking motor circuit. The entire mechanism except the clock is dead, and the gas or liquid is passing through by-pass 50 and 51. Testing is discontinued until pin 98 catches up with the end of slot 99 so that it can again drive disc 97. Soon after the driving action begins, the tooth 102 closes contact 103, actuating motor and so cam 55 which trips the sampling valve, lowering lug 57 by means of the release of follower 58 so that collar 39 and fingers 42 lower delivery stem 47 to sampling position and remove driving tension from pulley 34, stopping tape movement. By control of the cam positions and the lost motion slots, the sampling can be regulated, as any skilled mechanic can understand, both as to time and as to registry with the reagent spot. Gas or liquid pressure can be regulated by varying the speed of the gas or liquid pump or the setting of the pressure-reducing valve (104 on Fig. 8) so that the sample will go through the tape but will not perforate it.

Figure 4:
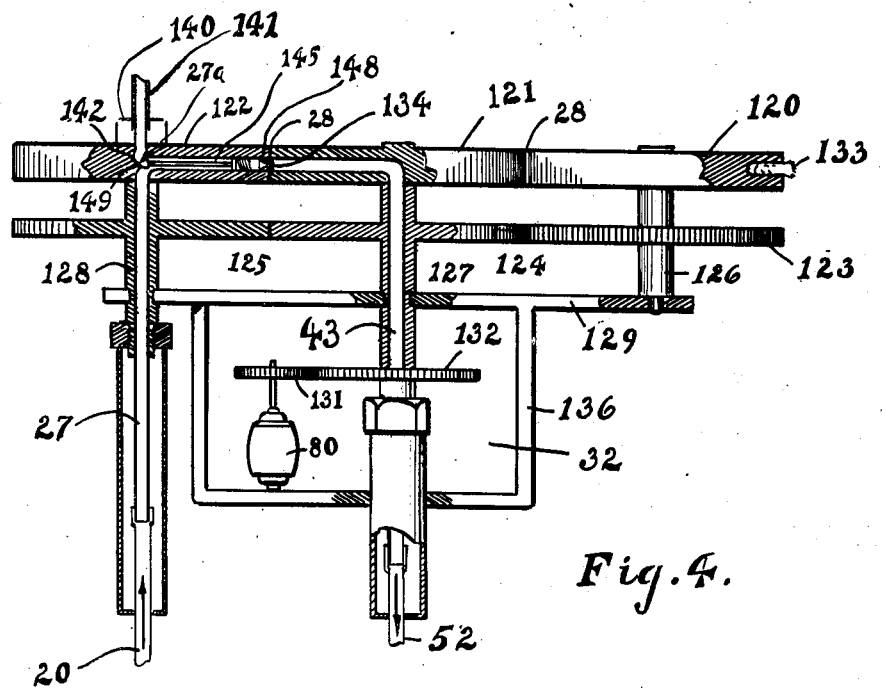
Fig. 4 is a longitudinal elevation, partly in section, of a modification of the valve controlling the fluid to be tested, this modification being adapted to handle liquids.
Figure 5:
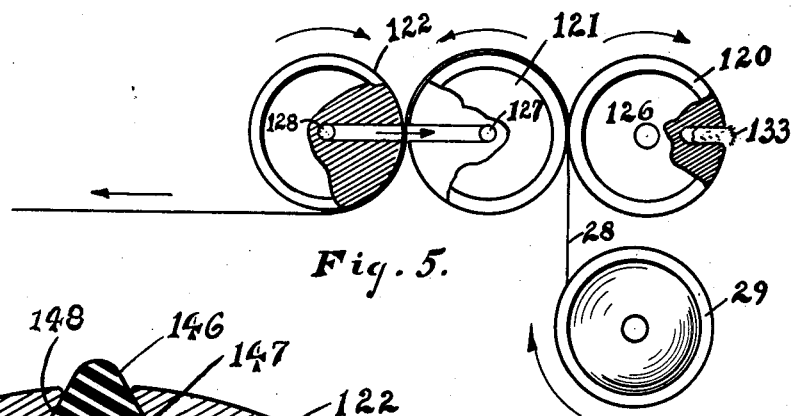
Fig. 5 is a plan view of a train of drums, one of which carries the liquid valve shown in Fig. 4, and illustrates how the tape is handled.
Figure 6:
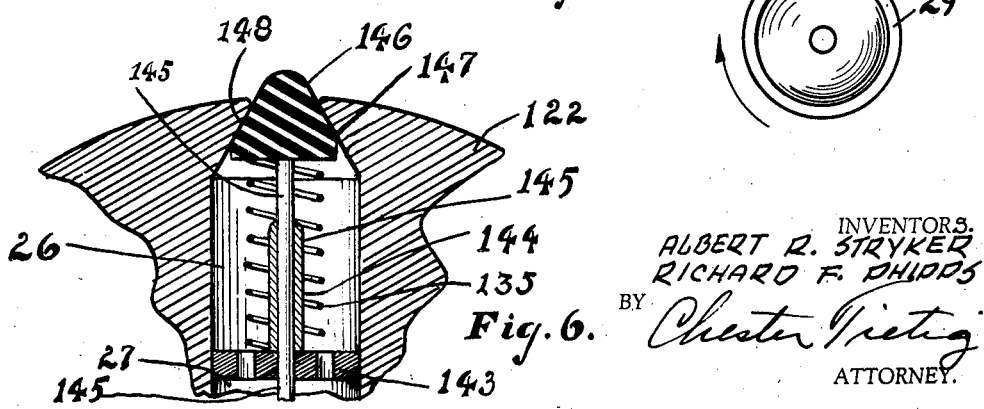
Fig. 6 is a detail view, partly in section of the liquid control valve alone in a section of a drum.

Referring now to Figures 4, 5 and 6 which illustrate different apparatus for carryying out the methods which will be described, 28 is a tape similar to the one previously described, and is drawn from a reel 29 (Fig. 5) also identical with a previously described one. Tape 28 passes first between a spotting drum 120 and an exhaust drum 121 and thence over the latter and between it and a delivery drum 122. In any case drums 120 and 122 rotate in a direction opposite to the rotation of drum 121.

As will be seen from Fig. 4, the three drums just mentioned are adapted to rotate in synchronism by means of keyed spur gears 123, 124 and 125 which are mounted on axial shafts 126, 127 and 128 of drums 120, 121 and 122 respectively. The shafts have a vertical bearing in a plate 129 which is positioned to act as a top closure or lid of a box-like structure 136, the further wall 32 of which corresponds to the panel of Figures 1 and 2.

Vertically mounted on the interior of box side 32 there is an electric motor 80, to the shaft of which is keyed a spur driving gear 131 which meshes with a spur gear 132 which is tight on the shaft 127. The latter is hollow, its inner duct 43 being an exhaust passage for the gas or liquid tested. Shafts 128 and 126 are mounted parallel to and similarly to shaft 127. Shaft 128 is also hollow, its duct 27 being a delivery pipe for samples and a continuation of main delivery pipe 20.

Drum 120 contains a reservoir (not shown) to which a wick 133 communicates. The reservoir is intended to be filled with reagent.

Drum 121 contains a continuation of exhaust passage 43, traversing the drum from its center to its periphery. At the mouth of this passage is a screen 134. It is fitted over the mouth of passage 43 so that it does not project beyond the drum but does fill in the periphery and preserve its roundness. The screen should be fine but strong.

In drum 122 a passage corresponding to the one in drum 121 is provided so that the two passages register at one point in the rotation of the drums. The outer end of passage 127 is constructed to a cone. The passage 27 within drum 122 is branched; from its elbow at the axis a curved passage 27a runs out the shaft 128 to a gland 140 to which is attached a tube 141 which leads to the atmosphere at a point remote from the apparatus. At the elbow a conical valve seat 142 (not shown) is formed.

Within passage 27 at the periphery of the drum (Fig. 6) is a sampling valve 26 which is roughly similar to an air valve in an automobile tire. It is mounted on a foraminous washer 143 which is tight in bore 27. Arising from the washer is a sleeve 144 which houses slidably a stem 145 to which is affixed a conical synthetic resin button 146 which fits the conical end 147 of passage 27. Extending rearwardly from washer 143 is a continuation of stem 145 which terminates in a conical synthetic resin button 149 which is adapted to co-operate with valve seat 148 (not shown). The stem 145, the button 149 and the elbow in 27 are so proportioned that when the tip or button 146 is pressed by screen 134 it will open passage 27 and will shut the passage 27a. At the elbow of 27a the passage is enlarged sufficiently that when conical plug or button 149 is off its seat, there will still be left sufficient room for the unrestricted passage of gas. A spring 135 is provided between washer 143 and button 146 so that the button 146 will be returned to its seat as soon as external pressure from drum 121 and the actual contacting members, screen 134 and tape 28 are removed.

While the form of apparatus described in Figures 1, 2 and 3 is preferred for gas testing, it may also be used for testing liquids. Likewise the form shown in Figures 4, 5 and 6 is best adapted for testing liquids although it may be used for testing gas. The reason for the preference is that the bibulous tape is wetter when liquids are tested since at least two drops are placed on the same spot of paper. This amount of moisture makes the tape difficult to handle without breaking, and the latter mentioned form of apparatus, while carrying out the same method, supports the tape over a greater area so that tearing is not so likely to occur.

It is evident from the foregoing descriptions that several methods of testing have been disclosed, one, that of spotting a bibulous tape at intervals with a drop of reagent and then forcing a gas through the wet spot. Another is the spotting at intervals of a bibulous tape with a drop of reagent and then forcing a drop of liquid to be tested through the first spot. A third method is to force a gas or liquid to be tested through a bibulous tape that has been entirely impregnated with an indicating reagent, say litmus, and then dried. A fourth method is spotting the tape with a drop of liquid at intervals, the tape however having the peculiarity of being impregnated in narrow longitudinal stripes with a plurality of indicators and then dried, these indicators being arranged in the order of their sensitiveness, to the test desired, say to acidity or alkalinity. The drop spreading across such a tape may be of such a pH as to affect some of these indicators and to leave others unchanged, thus disclosing its own condition. Gases may also be tested through such striped paper if the gases have any definite acidity or alkalinity, say $NH_3$ or $SO_2$. Preliminary spotting with distilled water may be here practiced.

It is to be understood that where little variation in pH will be encountered, that the tape may be impregnated with only one indicator, or if that is not the case, may be impregnated with any reasonable number of stripes. The pH test so obtained is of value in testing for salts in condenser water in steam power plants or in maintaining the acidity or alkalinity of electrolytic baths. This device can be attached to other pH testers.

The apparatus can be used to test the concentration of solids in air or other gases. This is done by running air, for instance, which is to be tested for smoke particles through pipe 20 and so through the apparatus just as if the smoke were a gaseous chemical constituent. Of course it is inadvisable to test smokes containing particles so large that they would clog the apparatus, but fogs and light smokes can be easily handled.

Illuminating gases containing artificial stenches such as ethyl mercaptan or other sulfur compounds can be tested for odor in the ordinary procedure described by forcing the gas sample through test paper moistened with lead acetate solution which also reacts with sulfur in the organic combinations named.

Figure 10:
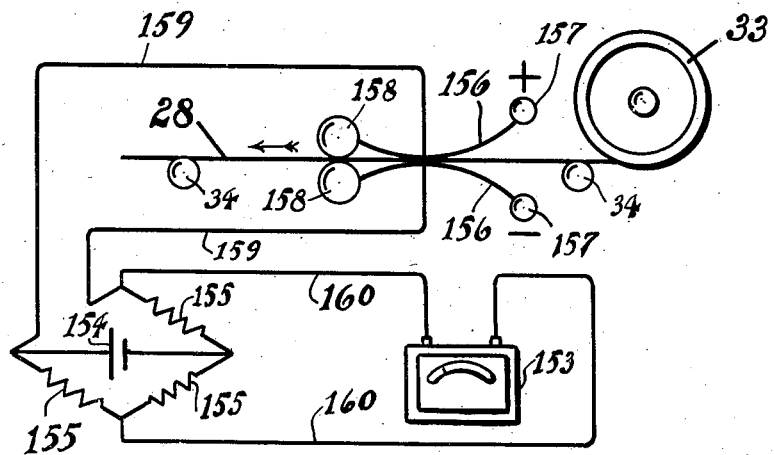
Fig. 10 is a diagram of an attachment for reading the pH value of a spot by means of a Wheatstone bridge circuit and special electrodes.

Referring now to Fig. 10, this figure shows an electrolytic pH reading attachment which is intended to read the tape after it has passed over the last pulley 33 of the testing apparatus. The advantage of this reading attachment is that the results can be indicated at a distance.

154 is a source of constant, low voltage current, for instance a wet battery, about which is arranged a Wheatstone bridge circuit. Three resistances 155 of the bridge have equal values while the place of a fourth resistance is taken by the spot (not shown) in the tape 28 through which current is brought to flow by means of the rectangular platinum foil electrodes 156. These are thick enough to have some spring action, yet thin enough to stay in wiping contact with the tape. Their arrangement has a great deal to do with obtaining such effect. They are conductively attached by welding or soldering to a pair of posts 157 which can be rotated for adjustment at least 90°. At the opposite end of the foil electrodes is a pair of nonconducting balls, or bars 158, preferably of synthetic resin, which are for the purpose of holding the foil in an arched position. Rotating the posts 157 determines the degree of arch and therefore the pressure. The tape travels toward the balls 158 and touches the electrodes at point of arch, thereby completing the bridge circuit through conductors 159. The resistance of the spot is indicated by the galvanometer 153 which may be calibrated to read directly in ion concentration. The calibration must necessarily take into account the class of liquid which is being tested because mere conductivity will not indicate whether a liquid is acid or alkaline. Its chief advantage is that it can be read at a great distance, this being governed by the length of galvanometer leads 160.

In connection with the gas testing it is pointed out that in cases where the recorder does not exhaust the gas to the unenclosed atmosphere, that is, to atmosphere outside of a building, (which lies within the purview of the invention), the alternative scheme, i. e. to carry away the exhausted gas after the test, is an essential step of the method. This is in order to prevent tape fogging, as has been explained.

There are many uses to which our apparatus and methods can be put, such as:—

1. H$_2$S in gases—using lead acetate as an indicator.
2. Cl in water using ortho-toluidine as an indicator.
3. NO in gases using greiss reagent.
4. CO in gases using iodin pentoxide.
5. Cyanides, using silver nitrate and chromate indicator.
6. Humidity with salts of cobalt, particularly the chloride.
7. pH of any liquid using tape striped with the following indicators in the order named:—

Methyl violet—range .1–1.5—yellow to blue.
Congo red—range 3.0–5.2—blue violet to red.
Azolitmin (litmus)—range 50–8.0—red to blue.
Phenolphthalein—range 8.2–10.0—colorless to red.
Nitramine—range 11.0–13.5—colorless to brown.

In the Examples 1, 3, 4 and 5, the gas is of course forced through a tape impregnated with the indicator. In Examples 2, 5 and 7 the tape is spotted with the liquid to be tested. Example 5 may be reversed so as to test the concentration of chromic acid in chromium plating baths by spotting a tape impregnated with silver nitrate and cyanide (KCn).

In using salts of cobalt to test the humidity or air, the entire apparatus except the delivery pipes, gasometer and pump must be enclosed in a substantially airtight cabinet. The tape must be impregnated with cobalt chloride solution, dried thoroughly and kept dry until in actual use, which occurs when the air to be tested is forced through portions of the tape, creating the usual series of spots. The reaction is $$CoCl_2.2H_2O + atm. H_2O \rightleftharpoons CoCl_2.6H_2O$$

When the partial pressure of water vapor in the air is greater than the dissociation pressure, the salt is red; when less, the salt is blue. Cobalt carbonate can also be used.

Figure 9:
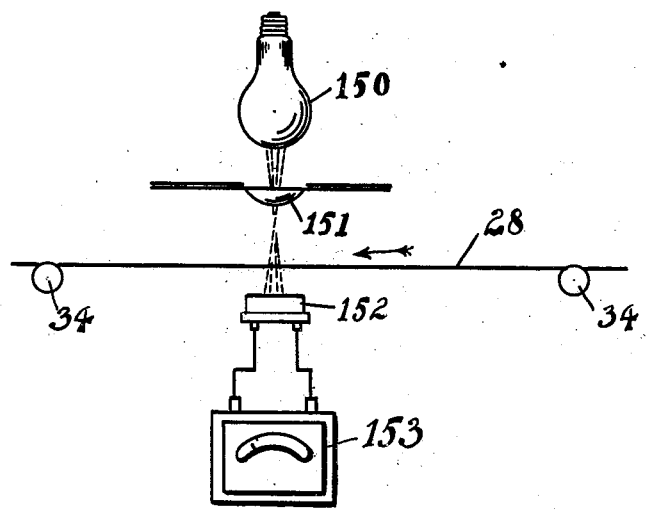
Fig. 9 is an elevation of an attachment for reading the spot on the tape by means of a light source and photocell.

Standardization of the different degrees of red and blue must be made against spots produced by known concentrations of moisture in air at known pressures with each photo-electric cell used with the circuit shown in Fig. 9. Variations in the photo-cell sensitivity make it impossible to give any general table. It is to be assumed also that as constant a light source as possible will be used for the tests. Humidity can then be read directly from the galvanometer scale.

The same method of standardization must be followed in the case of smoke testing, i. e., the photo-cell must be tested with a spot produced by a standard smoke. Not only smokes may be so tested and standardized but also suspensions of solids in liquids. This includes certain kinds of dye baths and inks.

In the foregoing remarks on standardizing cobalt chloride spots, it is assumed that the actual test will be carried out at the same temperature as the standardization. Furthermore it is assumed that a practically constant temperature will prevail in the building where the humidity is to be tested. This assumption is not unreasonable since in air-conditioned buildings, where it is expected that this method of humidity testing will find most of its application, the temperature varies very little. If necessary to correct for temperature variation between test and standardization, the corrections can be calculated from data given by Derbye and Yngve in "Journal of the American Chemical Society" Volume 44, pages 1664–7.

Fig. 9 shows the tape 28 after it has left either form of spot-making apparatus and is passing over a pair of pulleys 34 the end one of which is driven by an electric motor (not shown). Above the tape is a light source 150, the rays from which pass through a lens 151 and come nearly to a focus on the tape. Below the focal spot is a photocell 152 preferably of the Weston type (auto-generating) with which is connected a sensitive galvanometer or other indicating device 153. The operation of such a device is now familiar to almost every electrician, so no further description is necessary. The tape, photocell and galvanometer may conveniently be enclosed in a glass case with the spotting apparatus, while the light source and lens are preferred outside. The electric motor driving pulley 34 in Fig. 9 is in the same circuit as electric motor 80 in Fig. 2 so that the tape under the photoelectric reading device is given starts and stops in synchronism with those in the fluid forcing apparatus. The pH tester may be similarly arranged.

We claim as our invention:

1. An apparatus for testing fluids which comprises a bibulous tape, means for wetting said tape at separated areas, means for forcing a series of fluid samples through the wetted areas of said tape at intervals electrically controlled by a clock, pulley controlled means for moving said tape when no samples are being forced through same, clock means for regulating by electrical contact the intervals between the testing of samples, valve means for by-passing fluid through the apparatus when no sample is being tested and pipe means attached to said valve means for conducting away from the tape the residues of samples which have been tested.

2. An apparatus according to claim 1 comprising in addition means including a photocell for reading photoelectrically the changes on the tape produced by the testing operations.

3. An apparatus according to claim 1 which comprises in addition means including a spring pressed contact and a bridge circuit for reading the electrical conductivity of those areas on the tape which have been altered by the testing operations.

4. In combination in a fluid testing apparatus, a bibulous tape, a valve adapted to clamp said tape at time intervals for forcing through a limited area on said tape a sample of the fluid to be tested, an electric motor for moving said tape, a clock adapted to break the motor circuit for arresting said tape while a sample is being taken, a disc driven by said clock for regulating the length of time during which a sample is being taken, a pipe attached to said valve for conducting away from said tape the residue of samples after they have passed through the tape and means for by-passing fluid through the apparatus when no sample is being taken.

5. An apparatus according to claim 4 having in addition means for chemically preparing the tape to be sensitive to that constituent of the fluid for which the test is to be made.

6. In combination in a fluid testing apparatus, a bibulous tape, a sampling valve, a motor for driving said tape under said sampling valve, means for supplying fluid to be tested at uniform pressure to said sampling valve, a clock adapted to arrest at intervals the motor driving said tape and to bring into operation at such times said sampling valve, a reagent feeding device, means driven by said motor for causing said feeding device to spot said tape at intervals prior to the arrival of the spotted areas under said sampling valve, a by-pass for fluid through said sampling valve and means for exhausting the residues of fluid samples which have passed through the said tape.

7. In combination in a fluid testing apparatus, a bibulous tape, means comprising a plurality of drums for driving said tape, means for spotting said tape at intervals with a reagent, means in said drums for alternately by-passing the fluid to be tested and forcing it through said tape and means for conducting the residues of samples forced through said tape away from said tape.

8. In combination in a fluid testing apparatus a plurality of drums, means for rotating same, a porous tape traversing the peripheries of said drums, means in one of said drums for spotting said tape with a liquid, delivery means in one of the drums adapted to carry fluid to the periphery of said drum, exhaust means in another drum adapted to register with said delivery means, for carrying fluid from the periphery of said other drum through its driving shaft and the atmosphere, a by-pass in said latter mentioned drum, a sampling valve in said drum means in said delivery drum to open said sampling valve at intervals, said valve having means to close said by-pass when the valve is in sampling or open position.

9. In combination, a porous tape, means for wetting said tape at intervals, means for forcing a fluid through said tape in a series of spots coinciding with the wetted portions at successive intervals, said means including means for automatically moving and arresting said tape, means for reading said tape photoelectrically as to the transparency of said spots said tape being arranged to be fed under said reading means with the same starts and stops given to it by the fluid forcing apparatus.

10. In combination with a device for forcing a fluid through a porous tape, a starting and stopping mechanism therein for the tape, a conductivity tester working on said tape, said conductivity tester including a pair of arched foil electrodes contacting said tape, a Wheatstone bridge circuit and galvanometer arranged to indicate the electrical conductivity of said spot, said tape being arranged to be started and stopped in the conductivity tester in synchronism with the starts and stops imparted to said tape by the starting and stopping mechanism in the fluid forcing device.

11. In a fluid analysis apparatus, an electric motor, a clock controlling said motor, a reel of bibulous tape, a reagent pen containing a liquid, means for causing said pen to wet said tape at predetermined intervals, a valve adapted to force a gas sample thru said tape at the wetted portions thereof, means for carrying gas to be tested to said valve, means for carrying gas which has passed thru said tape away from the sphere of the reaction and means for automatically winding up said tape after each test is completed.

12. In a gas testing apparatus a constant speed motor, a worm drive on same, a pulley driven by said drive, a second pulley adapted to pull a tape, driven by said first pulley, a clock, a disc driven by said clock adapted to start and stop said motor, a lug on said disc, a freely pivoted trigger between said disc and said first pulley, the latter being adapted thereby to accelerate the travel of the disc, said lug being adapted to actuate said trigger, a worm driven shaft enclosed by said pulley, a cam driven by said shaft, a gas sampling valve actuable by said cam at intervals governed by said clock, means for traversing a tape through said sampling valve, said means being actuated by said second pulley, a pen adapted to moisten said tape at intervals and being actuable by means carried on said first pulley, and piping for delivering fluid to the sampling valve and for by-passing the fluid around said valve.

ALBERT R. STRYKER.
RICHARD F. PHIPPS.